(12) United States Patent
Haseltine

(10) Patent No.: US 7,765,129 B1
(45) Date of Patent: Jul. 27, 2010

(54) METHOD AND APPARATUS FOR OBTAINING IMAGES OF MERCHANDISE AS ARRANGED BY A CUSTOMER

(76) Inventor: Florence P. Haseltine, 10500 Rockville Pike, #1226, Rockville, MD (US) 20852

( * ) Notice: Subject to any disclaimer, the term of this patent is extended or adjusted under 35 U.S.C. 154(b) by 1024 days.

(21) Appl. No.: 11/462,963

(22) Filed: Aug. 7, 2006

Related U.S. Application Data

(63) Continuation of application No. 09/727,593, filed on Dec. 4, 2000, now Pat. No. 7,174,306.

(60) Provisional application No. 60/168,394, filed on Dec. 2, 1999.

(51) Int. Cl.
G06Q 30/00 (2006.01)
(52) U.S. Cl. .................. 705/26; 705/1; 705/27
(58) Field of Classification Search .......... 705/1, 705/26, 27
See application file for complete search history.

(56) References Cited

U.S. PATENT DOCUMENTS

| | | | |
|---|---|---|---|
| 5,515,268 A | | 5/1996 | Yoda |
| 5,551,021 A | * | 8/1996 | Harada et al. ............ 707/104.1 |
| 5,760,917 A | | 6/1998 | Sheridan |
| 5,862,330 A | | 1/1999 | Anupam et al. |
| 5,930,769 A | | 7/1999 | Rose |
| 5,970,471 A | * | 10/1999 | Hill .......................... 705/26 |
| 5,974,401 A | | 10/1999 | Enomoto et al. |
| 6,070,149 A | | 5/2000 | Tavor et al. |
| 6,260,000 B1 | | 7/2001 | Karasaki et al. |
| 6,307,568 B1 | | 10/2001 | Rom |
| 6,310,627 B1 | | 10/2001 | Sakaguchi |
| 6,578,072 B2 | | 6/2003 | Watanabe et al. |
| 7,197,479 B1 | * | 3/2007 | Franciscus de Heer et al. ... 705/27 |
| 2003/0212611 A1 | * | 11/2003 | Barrott et al. ................ 705/27 |
| 2009/0132390 A1 | | 5/2009 | Haseltine |

OTHER PUBLICATIONS

"Image Technology: A New Retail Vision?" Discount Merchandiser. Bristol: Mar. 1990. vol. 30, Iss. 3; p. 54. Retrieved via ProQuest on Feb. 26, 2010.*
"My Virtual Model-tm Launched by Public Technologies Multimedia," http://proquest.umi.com/pqdweb?index=85&did=00000, Montreal, Canada, Nov. 16, 1998, pp. 1-3.
ActiveTouch Launches WebEx Meeting Center: The First Application Service for Web-Based Multimedia Collaborative Meetings; Business Editors & Technology Writers; Business Wire; NewYork; Jul. 12, 1999.

* cited by examiner

*Primary Examiner*—Jeffrey A. Smith
*Assistant Examiner*—Michael A. Misiaszek

(57) ABSTRACT

Generic information provided by printed and online catalogs may be supplemented or replaced by information that is customized for or related to the consumer, enabling a third party to more fully understand the purchase decision and thus offer more informed feedback. A party accessing a merchant system may be provided electronic access to consumer-customized nonverbal information by, e.g., collecting an electronic version of consumer-customized nonverbal information at a merchant site, and displaying the electronic version of the consumer-customized nonverbal information for a party accessing the merchant system.

31 Claims, 7 Drawing Sheets

(USER PERSPECTIVE GENERAL OVERVIEW)

(MERCHANT PERSPECTIVE)

310A

Seychelles  Name  Kisha Blake

PLEASE COMPLETE THE FORM AND TAKE PICTURES          Notes on Preferences

Kisha     Blake
First Name   Last Name                                              Travel Easy
Address  815 West End Ave City  New York    State  NY
Zip Code  20018

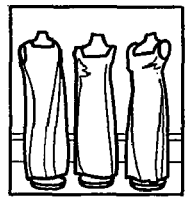

Take Picture

  

Event
                                                                    Graduation

[Take 2nd Picture]  [Take 3rd Picture]  [Take 4th Picture]

[back to reg menu]

Phone  212-444-1111          Email  kblake@seychelles.com

---

Credit Card Information

Type of Credit Card    ⊙ Visa   ○ MasterCard   ○ American Express   ○ Discovery
Credit Card Number     xxxx-xxxx-xxxx-1235
Expiration Month       December              Year 2004
                       If different from above address
Name on Credit Card
Address on Credit Card
State on Credit Card
Zip Code on Credit Card
Phone on Credit Card 31-10-2000
                                                         Date of Modification
Original Date

METHOD AND APPARATUS FOR OBTAINING IMAGES OF MERCHANDISE AS ARRANGED BY A CUSTOMER

PRIORITY

This application is a continuation of and claims priority under 35 U.S.C. §120 to U.S. application Ser. No. 09/727,593 filed Dec. 4, 2000 and now U.S. Pat. No. 7,174,306, which claims priority under 35 U.S.C. §119(e) to U.S. Provisional Application No. 60/168,394 filed Dec. 2, 1999, the disclosures of which are incorporated by reference herein in their entirety.

TECHNICAL FIELD

This invention relates to providing electronic access to consumer-customized nonverbal information regarding products and services, and may also relate to enabling collaborative shopping for products and services using a broadband medium such as the Internet.

BACKGROUND

Before purchasing merchandise, it is sometimes desirable and/or necessary for a consumer visiting a merchant to obtain feedback or approval from a third party remote to that merchant. Often, in seeking this feedback and/or approval, it is desirable to supplement a verbal description of the merchandise with non-verbal information that describes the product as it relates to the consumer. For instance, when shopping for clothing, a visual image significantly enhances a third party's understanding of the clothing and the appearance of the clothing when worn by the consumer (e.g., fit).

Conventionally, catalogs have been used to provide generic information for products and services offered by merchants. In a similar vain, merchant web sites recently have been used to store and reproduce online catalogs consisting of generic product descriptions for persons accessing the Internet. While helpful in gaining a general understanding of the products and services offered by a merchant, these catalogs do not relate products and services to any particular consumer, verbally or visually. Rather, they relate the products and services of a merchant to models and staged sets that leave the consumer to wonder how well the product or service will satisfy their needs.

For a third party to obtain nonverbal information that relates the sought-after product or service to the consumer, the third party must resort to other means. For instance, in the clothing example provided above, for a third party to obtain non-verbal information that relates the clothing to a consumer seeking their feedback and/or approval, the third party has generally had to accompany the consumer to the merchant and observe the consumer being fit with the clothing.

SUMMARY

Rather than requiring third parties to personally visit the merchant, real time or stored nonverbal information that conforms to consumer specifications is collected by a merchant and made electronically available to third parties remote to the merchant. Wired or wireless networking systems enable electronic communications between merchant and third party systems.

In this manner, the generic information provided by printed and online catalogs may be supplemented or replaced by information that is customized for or related to the consumer, enabling a third party to more fully understand the purchase decision and thus offer more informed feedback.

These concepts find particularly utility for merchants offering goods and services whose sale is premised on visual appearances. They may be used to reduce cycle time, increase market reach, enhance product exposure, and elevate the consumer excitement level to increase the likelihood of ultimate purchase. They also are used to establish an enduing record of transactions to enable future comparisons.

The details of one or more implementations are set forth in the accompanying drawings and the description below. Other features and advantages will become apparent from the description and drawings, and from the claims.

BRIEF DESCRIPTION OF THE DRAWINGS

FIG. 3A shows a sample record relating consumer-customized nonverbal information to identifying information and/or notes;

Like reference symbols in the various drawings indicate like elements.

DETAILED DESCRIPTION

Figure 1:
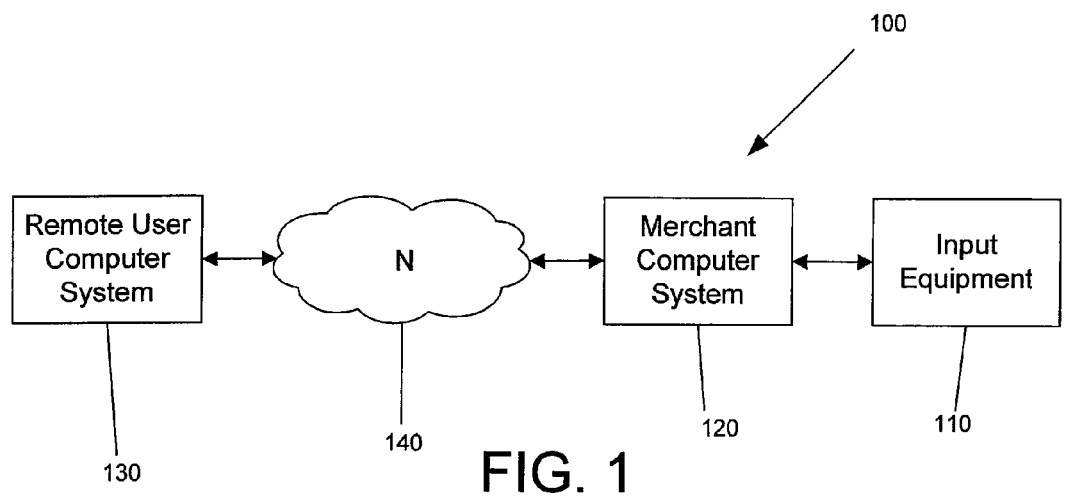
FIG. 1 shows an example of a system capable of providing consumer-customized nonverbal information to a party accessing a merchant system.

Referring to FIG. 1, a system 100 capable of providing consumer-customized nonverbal information generally includes input equipment 110, merchant computer system 120, remote user computer system 130, and network 140.

Input equipment 110 and merchant computer system 120 collectively gather merchandise information and make that information available to parties accessing the merchant computer system 120. The merchandise information may include consumer-customized nonverbal information, e.g., nonverbal information describing merchandise arranged or configured as specified by the consumer. In one particular example, the consumer-customized nonverbal information includes clothing being modeled by the consumer or by some other person of the consumer's choosing. In another particular example, the consumer-customized nonverbal information includes tools or equipment arranged as specified by the consumer to demonstrate their utility or adaptability.

Input equipment 110 and merchant computer system 120 may be operated independently in which case information collected by input equipment 110 is merely communicated to merchant computer system 120. Alternatively, input equipment 110 may be operated in conjunction with merchant computer system 120 to collect and communicate input from the consumer in response to requests received from merchant computer system 120.

More specifically, input equipment 110 generally includes equipment capable of collecting audio, video and other input from a consumer (hereinafter "primary consumer"). Input equipment 110 may include video or still camera equipment of digital type, but alternatively may include video or still camera equipment of the analog type accompanied with a digitizing device such as a digital scanner. In any case, the camera equipment is generally capable of collecting full or partial length images and of manipulating collected images. Input equipment 110 may also include other standard input/output devices, such as, e.g., a microphone, and interfacing equipment. Where a video camera or microphone is used, a continuous stream of data may be communicated by input equipment 110 to merchant computer system 120.

Merchant computer system 120 generally includes devices capable of soliciting, collecting and providing access to nonverbal consumer-customized information, consumer identification information and other related information (hereinafter "notes"), from input equipment 110 or otherwise. Examples of identification information include consumer name, billing and shipping addresses, telephone numbers, electronic mail (e-mail) address and passwords of at least the primary consumer, and examples of notes include image or merchandise description, merchandise price, and consumer comments. Merchant computer system 120 generally includes a personal computer, but may include an intranet with several interconnected intelligent or dumb workstation terminals having simultaneous or shared access to a central or distributed repository of data. In any case, merchant computer system 120 includes a modem (e.g., standard, cable, digital subscriber line (DSL)) or other communication device to enable communications over network 140.

Remote user computer system 130 generally includes interfacing equipment capable of enabling access to network 140 and thus merchant computer system 120, one or more output devices capable of enabling an operator of remote user computer system 130 (hereinafter "secondary consumer") to perceive information, and input devices capable of communicating feedback from the secondary consumer to the primary consumer or merchant computer systems. Remote user computer system 130 generally includes a personal computer, an example of which will be described with respect to FIG. 1A. Remote user computer system 130 may also include a wired or wireless information device such as a personal digital assistant (PDA) or web-enabled telephone.

Network 140 enables electronic communications between merchant computer system 120 and remote user computer systems 130. Network 140 may be wired or wireless. It 120 generally includes a computer network, e.g., a wide area network (WAN) such as the Internet, or local area network (LAN). Network 140 may also or alternatively include other networks such as the plain old telephone system (POTS) network. Through network 140, one or more remote user computer systems 130 may gain access to information within the merchant computer system 120, and may communicate feedback to the consumer or merchant computer system 120.

Although not shown, a second network and corresponding interfacing equipment may be used to enable the primary consumer or merchant to notify the secondary consumer of information to be accessed at the merchant computer system 120. For instance, a plain old telephone system (POTS) may be used to enable the primary consumer and/or merchant to request feedback from a secondary consumer, or to notify the secondary consumer of consumer-customized nonverbal information that is available for downloading or streaming. In another example, merchant computer system 120 may include equipment or software (e.g., automated telephone equipment, instant messaging software, and/or email software) to enable automatic or manual notification. Correspondingly, remote user computer system 130 may include equipment or software to enable perception of the notification, delayed or immediate feedback to the notification, delayed or immediate access to the referenced information, and feedback regarding that referenced information.

Figure 1B:
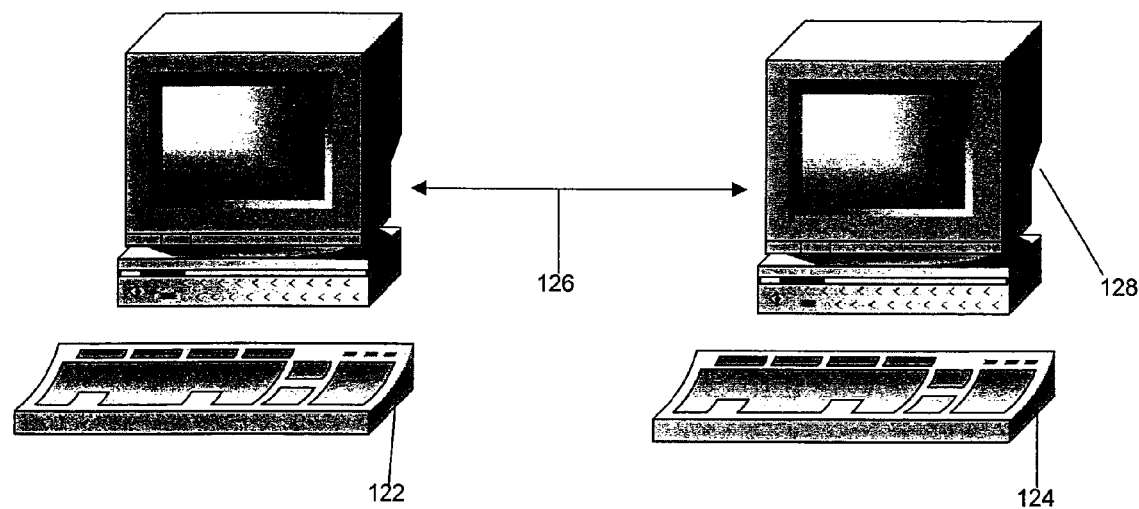
FIG. 1B shows an example of the merchant computer system of FIG. 1.
Figure 1A:
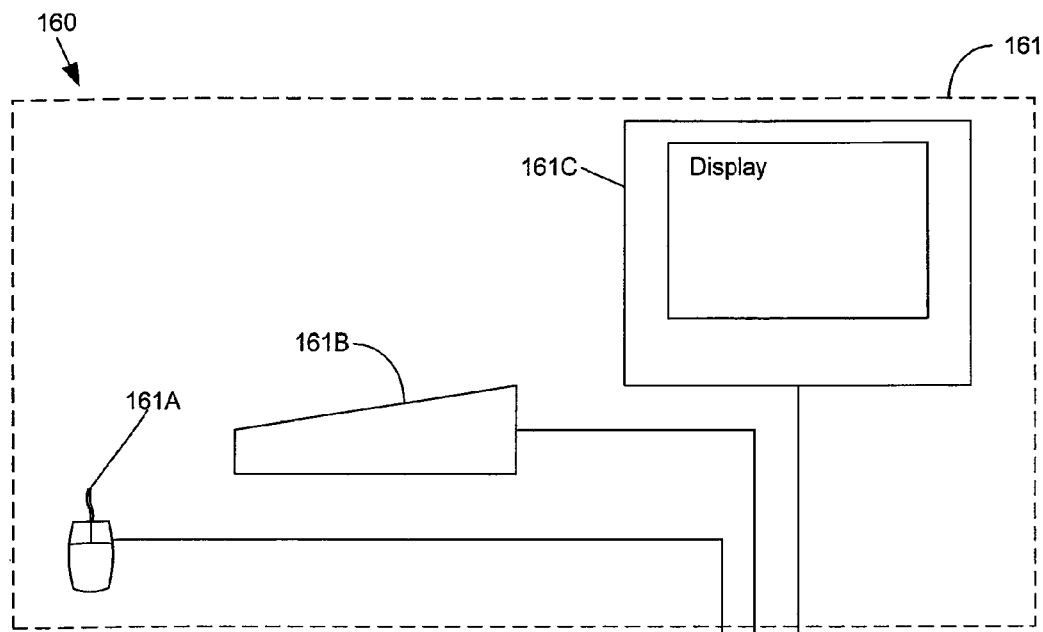
FIG. 1A shows an example of components within the remote user and/or merchant computer systems of FIG. 1.
Figure 1A:
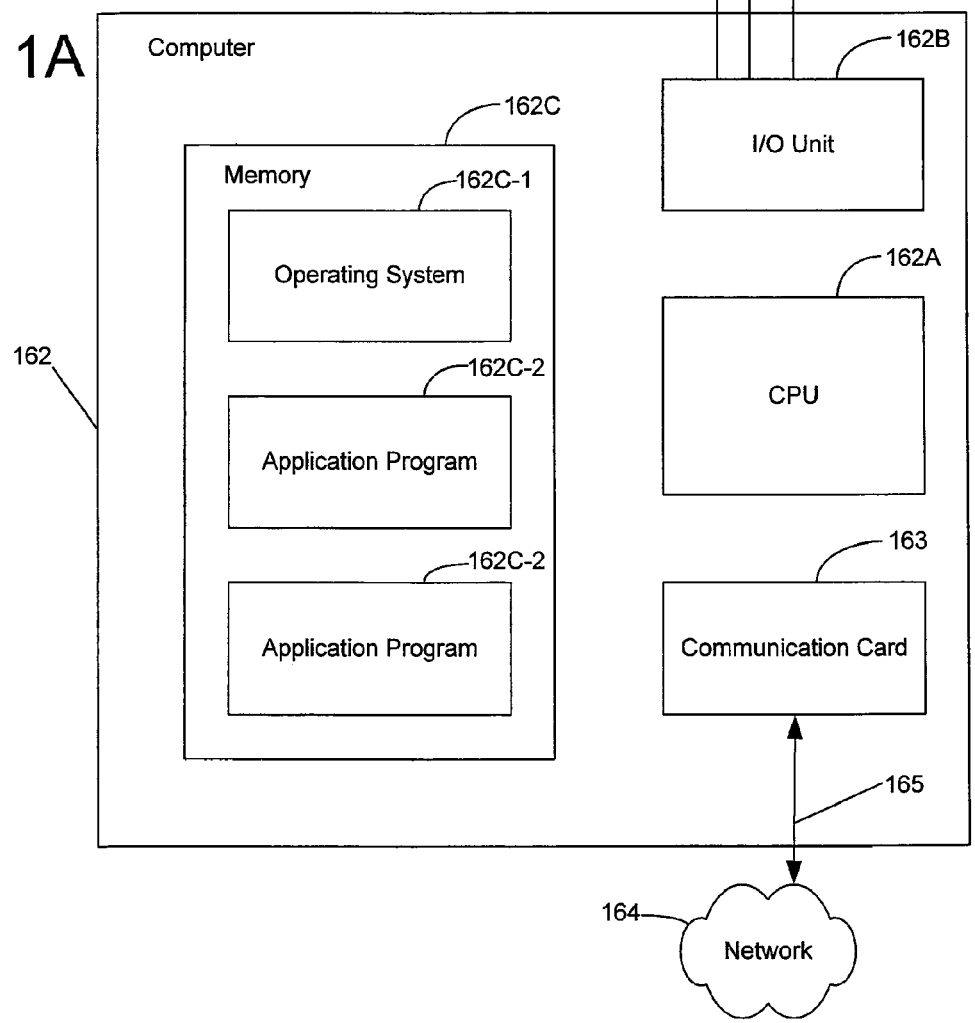

Referring to FIG. 1A, a computer system 160 represents an example of a hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The computer system 160 of FIG. 1A may also be programmed with computer-readable instructions to enable content to be perceived (e.g., viewed) without being captured (e.g., copied, saved, or printed).

The system 160 includes various input/output (I/O) devices 161 and a general purpose computer 162. I/O devices 161 may include mouse 161A, keyboard 161B, and display 161C, as shown, and may also or alternatively include other devices such as touch screens, video cameras, microphones, scanners, printers, wired or wireless devices (e.g., cellular telephone, personal digital assistant (PDA) or appliance). General purpose computer 162 may include central processor unit (CPU) 162A, I/O unit 162B and memory 162C that stores data and various programs such as operating system 162C-1 and one or more application programs 16C-2. The computer system 160 preferably also includes some sort of communications card or device 163 (for example, a modem or network adapter) for exchanging data with network 164 via communications link 165 (e.g., a telephone line).

Referring to FIG. 1B, a combination of more than one computer system may be used to implement merchant computer system 120. For instance, merchant computer system 120 may include computer 122 and computer 124. Computers 122 and 124 may by physically independent, communicating by physical communications link 126, and requiring implementation on independent devices. Conversely, computers 122 and 124 may share devices, such that their independence is virtual and the communications link 126 interconnecting those computers is implemented through software. Either or both of computers 122 and 124 may be implemented using devices such as those shown by FIG. 1A.

Computer 122 is generally a merchant host computer, providing an interface for remote users 130 to perceive when communications are enabled through network 140. For instance, computer 122 may include software or links to software enabling web page access and/or search functionality. More specifically, computer 122 may store or access and display a screen that includes an embedded link to a search program capable of searching and retrieving information from within computer 124. The screen may result from code written in any of various languages, such as hypertext markup language (HTML), standard generated markup language (SGML), extensible hypertext markup language (XHTML), extensible markup language (XML), or otherwise.

Computer 124 generally includes software for generating, storing and accessing records relating consumer-customized nonverbal information to consumer identifying information and notes. The software stored on computer 124 typically includes a relational database that stores records including related consumer-customized nonverbal information, identifying information for the primary consumer, and notes. Software 128 also may be used to control input equipment 110 and/or to integrate identifying information and notes entered at computer 124 with input received from input equipment 110. One example of the aforementioned software includes the Filemaker™ program equipped with a Troy™ plug-in module. Using this software, computer 124 can be used to control input equipment 110, to collect information from the primary consumer regarding images and other information collected by input equipment 110, to create records combining the related information to be stored and/or streamed, and to collect feedback from the secondary consumer when received.

Additional integrating software may also be incorporated into computer 124 to automate the notification process based on information collected from the primary consumer regarding the secondary consumer. For instance, if instant messaging or electronic mail software is installed on or accessible to computer 124, computer 124 may be configured to automatically send an instant message or email to the secondary consumer when an instant messaging or email address for the secondary consumer is entered by the primary consumer. As such, the identifying information collected from the primary consumer and related to the record or data stream may include identifying information for the secondary consumer, such as an instant messaging address, email address and/or telephone number. The instant message or email may be sent immediately upon entry of the address for the secondary consumer, or it may be sent at some later time as instructed by the primary consumer.

Similar software may also be stored on computer 124 to enable notification of feedback from secondary consumer to the primary consumer and/or merchant. In this manner, the primary consumer may make a prompt purchasing decision once feedback is received, or the merchant may expedite processing of an order once authorization is received from the secondary consumer. For instance, where the primary consumer provides standing instructions indicating that the purchase may be completed upon authorization or approval of the secondary consumer, processing of the purchase may be expedited through communication of that authorization or approval to the merchant. In this case, the request for feedback may include a request for payment information from the secondary consumer to enable a purchase.

Implementing merchant computer system 120 using more than one computer, whether physical or virtual, allows the merchant the flexibility to inhibit access to the consumer-customized nonverbal data without inhibiting access to the merchant web page, thus enhancing security and flexibility.

Figure 2:
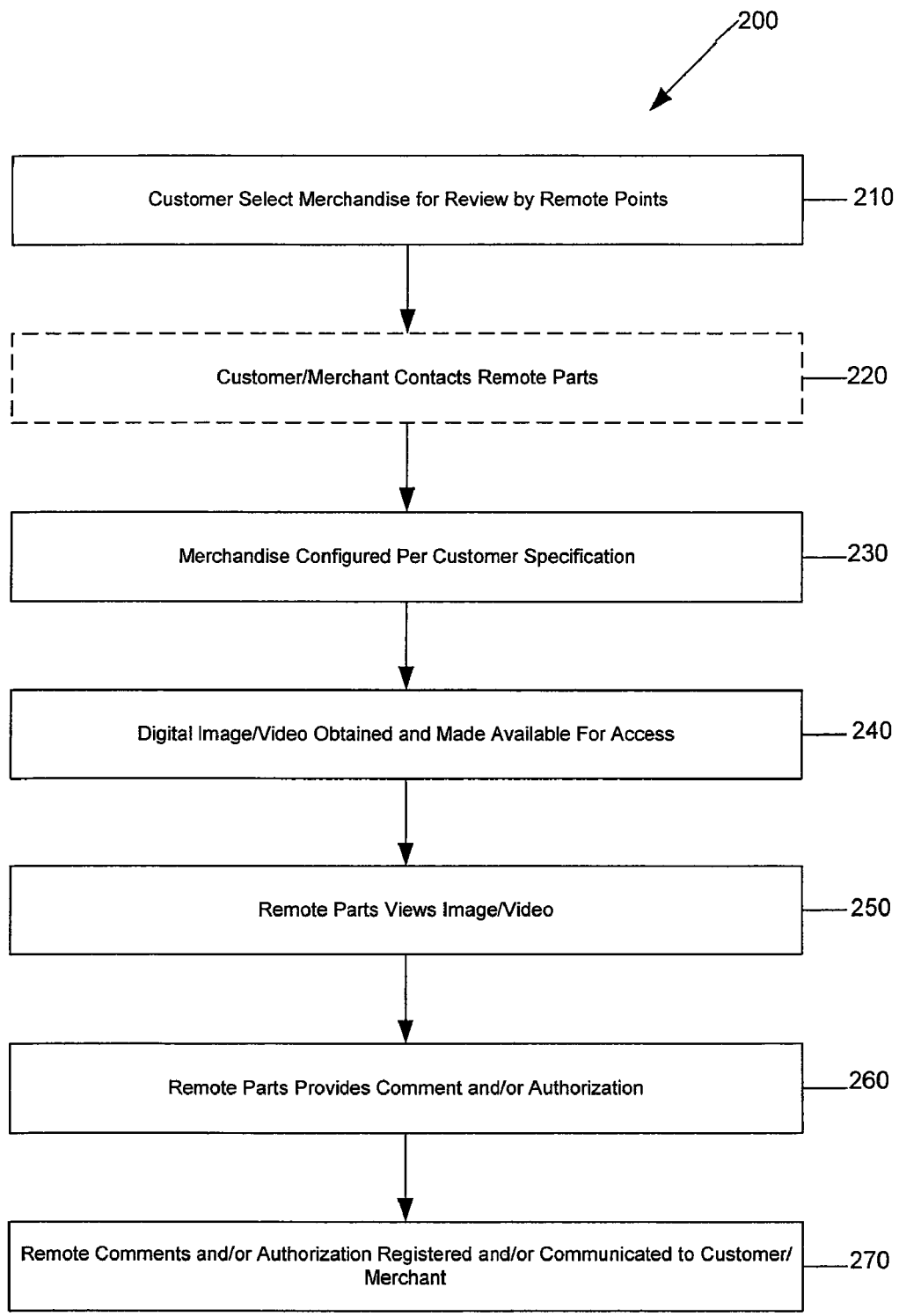
FIG. 2 shows an example overview of a process for providing consumer-customized nonverbal information to a party accessing a merchant system from the perspective of a consumer.

Referring to FIG. 2, an exemplary process 200 perceived and performed by consumers includes several general steps. After the primary consumer selects merchandise of interest (step 210), the merchandise is arranged and/or configured according to primary consumer specification (step 230), and still or video images are obtained of the consumer-customized arrangement or configuration of merchandise (step 240). For instance, where a consumer is shopping for clothing, the clothing that is selected (step 210) may be modeled by the consumer or another consumer-selected individual (step 230), and an image of the clothing being modeled may be obtained by the merchant (step 240).

The primary consumer or merchant may attempt to contact the secondary consumer at various times throughout this process. For instance, as shown by step 220, an attempt may be made before the merchandise is configured according to consumer specification (step 230) and before consumer-customized nonverbal information is collected (step 240), allowing the secondary consumer to receive streaming of information substantially in real-time. However, an attempt also may be made after either of steps 230 and 240 to enable viewing of stored images or data streams. In any case, to make such an attempt, a standard or cellular telephone, instant messaging, email or some other means may be used.

Once a digital image or stream of the consumer-customized arrangement or configuration of merchandise has been obtained, the secondary consumer may perceive the image or stream (step 250), and may provide feedback generally in the form of comments and/or authorization (step 260). Authorization may include payment information, particularly where the secondary consumer is relied upon for purchasing decisions.

Finally, the feedback is registered and/or communicated to the primary consumer and/or merchant. Thereafter, the purchase may be automatically enabled/refused, or the primary consumer may take additional steps to enable/refuse the purchase, e.g., with reference to registered feedback.

Figure 3:
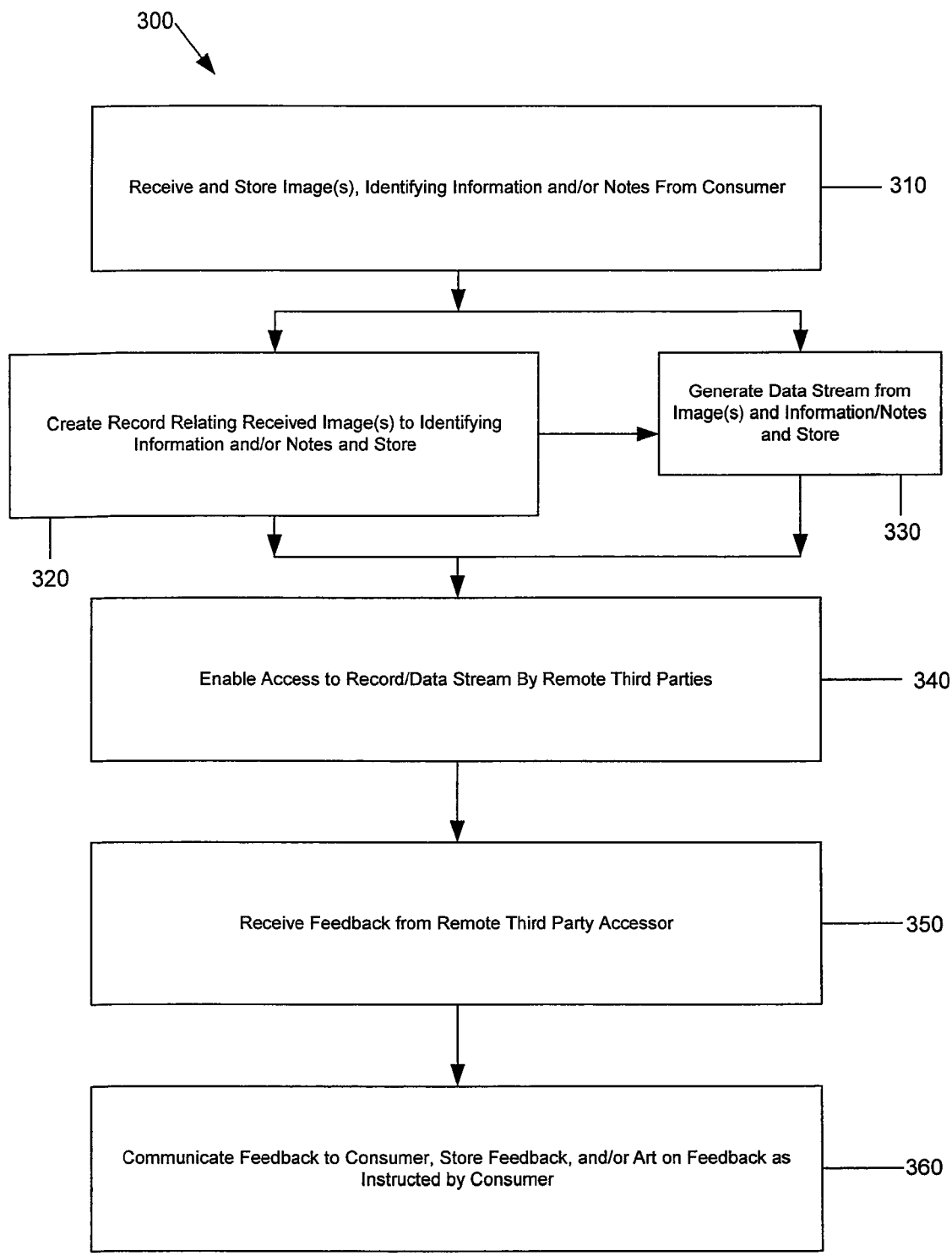
FIG. 3 shows an example overview of a process for providing consumer-customized nonverbal information to a party accessing a merchant system from the perspective of a merchant.

Referring to FIG. 3, an exemplary process 300 perceived and performed by the merchant includes several general steps. Images and other information are received from input equipment 110, and related identifying information and notes are received from the primary consumer (step 310). Where the images are obtained for future access, records that relate the received images to identifying information and/or notes may be created and stored (step 320). Similarly, where a stream of images are obtained for future access, one or more records that relate the images within the stream to identifying information and/or notes may be created and stored (step 330). FIG. 3A illustrates a sample record reflecting the relationship established between images and identifying information and notes.

However, where real-time access and viewing of the image, images or data stream is desired, it may be unnecessary to store the record and image(s) or data stream. In this instance, the identifying information may be stored merely to enable remotely-located secondary consumers to locate the image(s) or data stream for streaming, thus saving storage space.

Figure 3B:
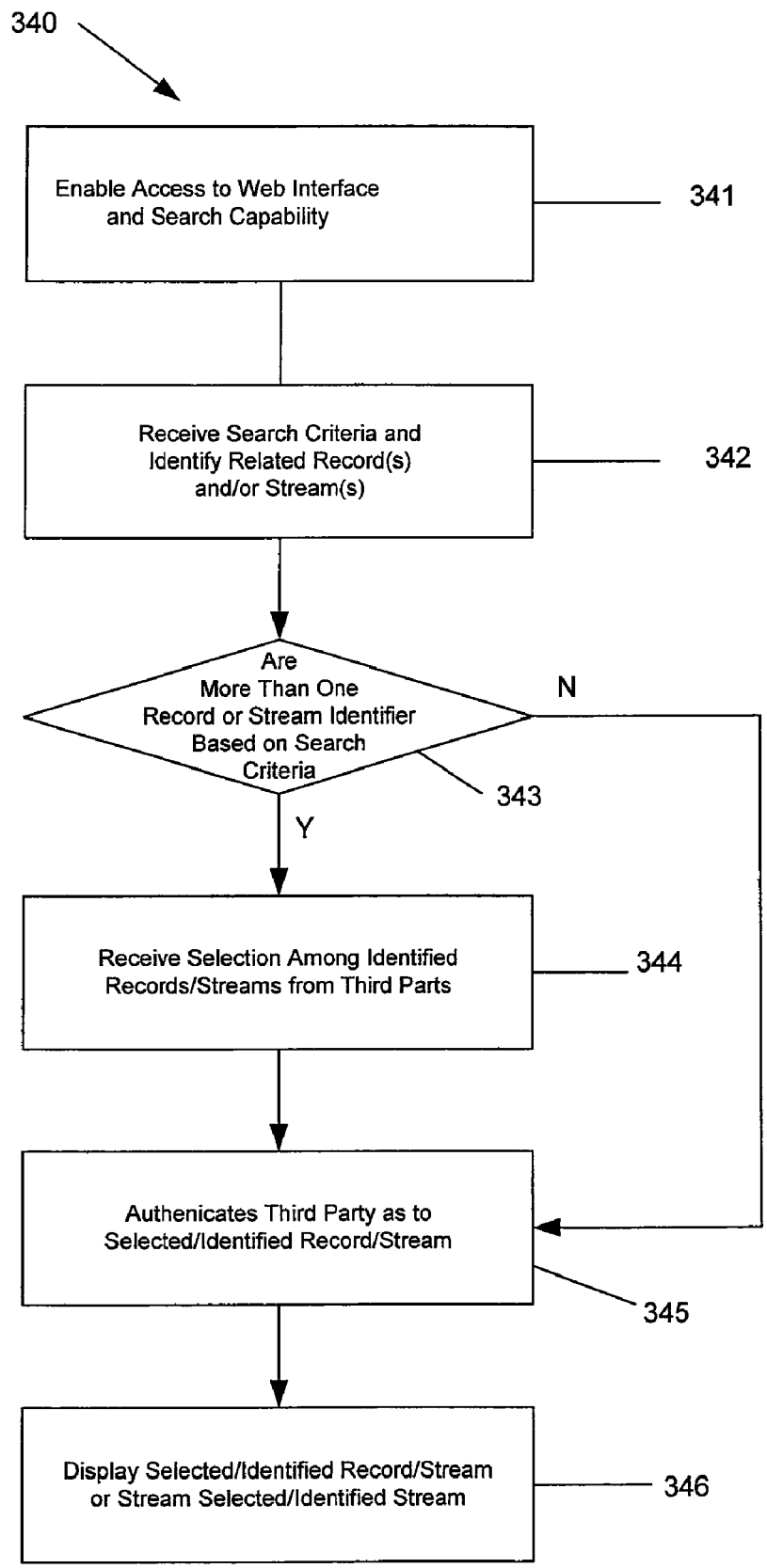
FIG. 3B shows an example of a process for enabling access to consumer-customized nonverbal information.
Figure 3C:
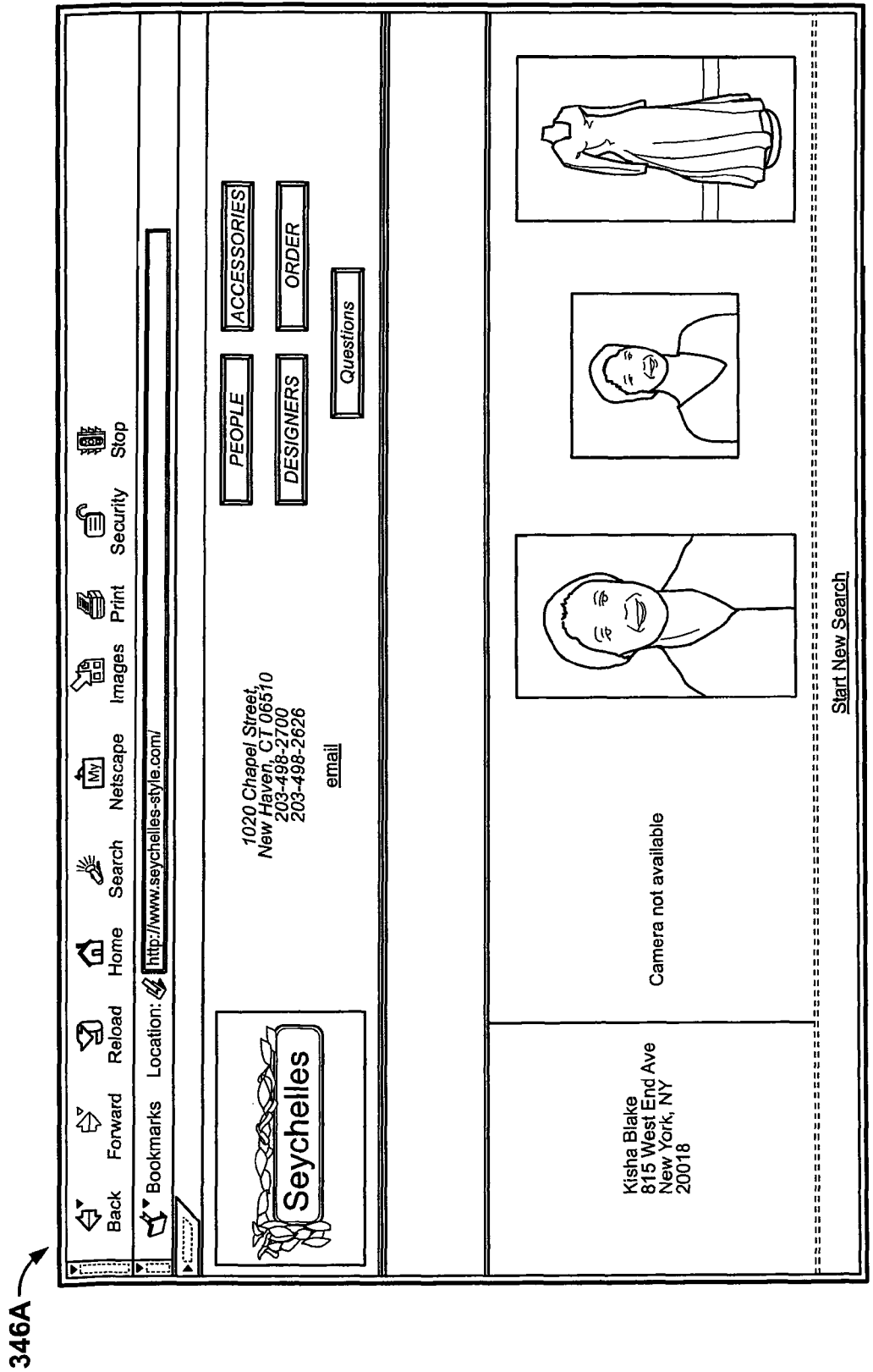
FIG. 3C shows an example of screen used to display consumer-customized nonverbal information.

Once records and/or data streams have been created based on the images and identifying information and/or notes, access is enabled for remote secondary consumers to the record or data stream, and thus the consumer-customized nonverbal information (step 340). For instance, referring to FIG. 3B, merchant computer system 120 enables secondary consumers access to stored records or data streams through an interface to, e.g., computer 322 of merchant computer system 120 (step 341). Identifying information or search criteria from the secondary consumer is then received, and a search is performed to identify a desired record or data stream using, e.g., an HTML page specified by searching software provided or accessed by computer 324 of merchant computer system 120 (step 342). Based on the search criteria, a search of available records and/or data streams is performed to return search results. When more than one record or data stream matches the received identifying information or search criteria (step 343), merchant computer system 120 prompts secondary consumer for additional information or selection among the identified records or data streams, and receives this selection information or further search criteria to repeat steps 342 and 343 (step 344). When a record or data stream is ultimately identified by the secondary consumer, an authentication process may be performed to ensure that the primary consumer desires to enable access to this particular secondary consumer. For instance, a password or other information may be collected from the secondary consumer and compared with information specified by the primary consumer. In this manner, different levels of security may be enabled to provide different secondary consumers with access to different images. Ultimately, for secondary consumers that are authenticated, records or data streams identified are displayed or streamed, e.g., in the format shown by FIG. 3C.

Based on the information accessed, feedback from the secondary consumer is received (350), communicated to the consumer, stored and/or used to authorize or disallow purchase of the merchandise (step 360).

The systems and processes described above have particular utility in retail applications, where consumers sometimes prefer to compare the goods of one retail operation to the goods of another retail operation, and where enabling comparison of consumer-customized arrangements or configurations may be preferred. For instance, apparel, jewelry and other accessories are each items that consumers like to see customized to their choosing, e.g., by trying them on, before purchasing. The systems and processes may also find particular utility when used to display images or data streams to demonstrate services available to meet consumer specifications. Furthermore, these systems and processes are useful where primary consumers seek feedback or are required to obtain authorization or payment approval for purchases from secondary consumers, e.g., in a guardian-minor and employer-employee relationships.

A number of implementations have been described. Nevertheless, it will be understood that various modifications may be made without departing from the spirit and scope of the claimed invention. For example, although the terms primary and secondary consumer are used in the above description, they may be the same entity and either may be a nonconsumer. More specifically, the secondary consumer may not be a consumer at all; they may instead be a third party to the transaction, merely providing feedback to the first consumer. Similarly, the primary consumer may be a third party to a transaction between the secondary consumer and the merchant, the primary consumer merely choosing items for review by the secondary consumer. Furthermore, the primary and secondary consumer may be the same entity. Still further, although the consumer-customized nonverbal information is described as being viewed from locations remote to a merchant site, this information may also be available for viewing at the merchant site (e.g., useful in comparing outfits during a fitting process, or at a later date), or at or in conjunction with other merchant sites. For instance, where several related merchants (e.g., by affiliation, location, product type) provide electronic access as described herein, the customer-customized nonverbal information for two or more of those merchants may be jointly displayed or linked. Accordingly, other implementations are within the scope of the following claims.

What is claimed is:

1. A method comprising:
   obtaining a first image of a first item of merchandise that is available from a first merchant as physically arranged according to a consumer at a physical location having the first item;
   obtaining a second image of a second item of merchandise that is available from a second merchant as physically arranged according to the consumer at a physical location having the second item;
   storing, by a merchant computer system, the first image and second image in a data record associated with a password specified by the consumer to enable selective access to the data record;
   authenticating, by the merchant computer system, a remote device to access the data record based at least in part upon receiving the password from the remote device; and
   communicating, by the merchant computer system, the data record including the first image in conjunction with the second image to the remote device over a network.

2. The method of claim 1 wherein communicating the data record including the first image in conjunction with the second image comprises sending a web page to a browser of the remote device, the web page configured to enable access to the first image and the second image.

3. The method of claim 1 further comprising receiving feedback from a party that accesses the first image or the second image via the remote device.

4. The method of claim 3 wherein receiving the feedback includes receiving authorization for purchase of the first item of merchandise or the second item of merchandise.

5. The method of claim 3 wherein receiving the feedback includes receiving a recommendation for purchase.

6. The method of claim 1 wherein obtaining the first image of the first item includes obtaining the first image of the first item of merchandise as arranged by the consumer at a merchant's physical premises.

7. The method of claim 1 further comprising:
   receiving input from the consumer to direct physical arrangement of the first item of merchandise at the merchant's physical premises.

8. The method of claim 7 further comprising capturing the first image of the first item of merchandise as physically arranged by the consumer.

9. The method of claim 1 wherein obtaining the first image includes obtaining one or more still photos of the first item of merchandise.

10. The method of claim 1 wherein obtaining the first image includes obtaining a video clip of the first item of merchandise.

11. The method of claim 1 wherein obtaining the first image of the first item of merchandise includes obtaining the first image that reflects at least one clothing garment as arranged by the consumer.

12. One or more computer-readable memories storing instructions that, responsive to being executed by one or more devices of a merchant computing system, cause the one or more devices of the merchant computer system to perform operations comprising:
   creating a data record secured by identifying information specified by a consumer;
   storing, in the data record, a first image of a first item of merchandise as physically arranged at a physical location having the first item according to the consumer in conjunction with a second image of a second item of merchandise as physically arranged according to the consumer at a physical location having the second item;
   authenticating a remote device to access the data record responsive to receiving the identifying information from the remote device; and
   communicating the data record including the first image in conjunction with the second image to the remote device over a network.

13. One or more computer-readable memories of claim 12 wherein communicating the first image in conjunction with the second image includes sending a web page to a browser of the remote device, the web page configured to enable access to the first image and the second image.

14. One or more computer-readable memories of claim 12 wherein the operations caused by the instructions further comprise receiving feedback from a party that accesses the first image or the second image.

15. One or more computer-readable memories of claim 14 wherein the feedback includes authorization for purchase of the first item of merchandise or the second item of merchandise.

16. One or more computer-readable memories of claim 14 wherein the feedback includes a recommendation for purchase.

17. One or more computer-readable memories of claim 12 wherein the operations caused by the instructions further comprise outputting a user interface to enable input from the consumer to direct physical arrangement of the first item of merchandise at a merchant's physical premises.

18. One or more computer-readable memories of claim 17 wherein the operations caused by the instructions further comprise receiving, via the user interface, the input from the consumer to direct physical arrangement of the first item of merchandise at the merchant's physical premises.

19. One or more computer-readable memories of claim 18 wherein the operations caused by the instructions further comprise capturing the first image of the first item of merchandise as physically arranged by the consumer.

20. One or more computer-readable memories of claim 12 wherein the first image includes one or more still photos.

21. One or more computer-readable memories of claim 12 wherein the first image includes a video clip.

22. One or more computer-readable memories of claim 12 wherein the first item of merchandise includes at least one clothing garment and the first image reflects the clothing as arranged by the consumer.

23. An apparatus comprising:
a computing device;
computer readable memory; and
computer instructions embodied on the computer readable memory and executable via the computing device to:
capture a first image of a first item of merchandise that is available from a first merchant as physically arranged according to a consumer at a physical location having the first item;
capture a second image of a second item of merchandise that is available from a second merchant as physically arranged according to the consumer at a physical location having the second item;
create a webpage configured to display the first image in conjunction with the second image;
secure the webpage using identifying information selected by the consumer; and
output the webpage configured to display the first image in conjunction with the second image to enable viewing at a remote device over a network responsive to authenticating the remote device based on the identifying information.

24. The apparatus of claim 23 wherein the first image includes one or more still photos.

25. The apparatus of claim 23 wherein the first image includes a video clip.

26. The apparatus of claim 23 wherein the computer instructions further comprise instructions executable via the computing device to:
collect feedback input at the remote device responsive to output of the webpage; and
communicate the feedback to the consumer.

27. The apparatus of claim 26 wherein the feedback comprises a recommendation regarding purchase of the first item or the second item.

28. The apparatus of claim 26 wherein the feedback comprises an authorization to purchase the first item or the second item.

29. The apparatus of claim 23 wherein the computer instructions further comprise instructions executable via the computing device to:
request authorization, from a remote party that accesses the webpage via the remote device, to purchase one of said items of merchandise; and
automatically complete a purchase transaction for one of said items of merchandise when authorization is received.

30. The apparatus of claim 23, wherein the identifying information comprises an email address.

31. The apparatus of claim 23, wherein the identifying information comprises a password selected by the consumer.

* * * * *